United States Patent [19]
Harris

[11] 3,941,695
[45] Mar. 2, 1976

[54] ZERO ENERGY INPUT FLOCCULATOR

[76] Inventor: W. Leslie Harris, 1438 Yosemite Circle, Concord, Calif. 94521

[22] Filed: Dec. 26, 1973

[21] Appl. No.: 427,771

[52] U.S. Cl. .................. 210/49; 210/208; 210/219; 210/320; 259/4 R
[51] Int. Cl.² .............................................. C02B 1/20
[58] Field of Search ....... 210/49, 42, 208, 207, 219, 210/319, 320, 156, 157; 259/4; 261/92, 91

[56] References Cited
UNITED STATES PATENTS

| | | | |
|---|---|---|---|
| 1,466,053 | 8/1923 | Ladd et al. | 210/319 |
| 2,128,569 | 8/1938 | Velz | 210/320 |
| 2,155,764 | 4/1939 | Lissauer | 210/319 |
| 2,633,453 | 3/1953 | McAllister | 210/49 |
| 3,598,239 | 8/1971 | Mackrle et al. | 210/208 |
| 3,799,515 | 3/1974 | Geerlings | 261/120 |

Primary Examiner—Charles N. Hart
Assistant Examiner—Benoit Castel
Attorney, Agent, or Firm—Townsend and Townsend

[57] ABSTRACT

A flocculator for use in water treatment plants which comprises a paddle wheel disposed in a sedimentation basin. The wheel is defined by a plurality of equally spaced semicylindrical paddles which at all times are fully submerged in the water and which are constructed of a relatively thin sheet material that is undulated in a direction perpendicular to the length of the paddles. The paddles extend across the full width of the basin and they are secured to rotatably mounted hubs. The water flow in the basin provides the sole source of motive power for rotating the wheel.

19 Claims, 3 Drawing Figures

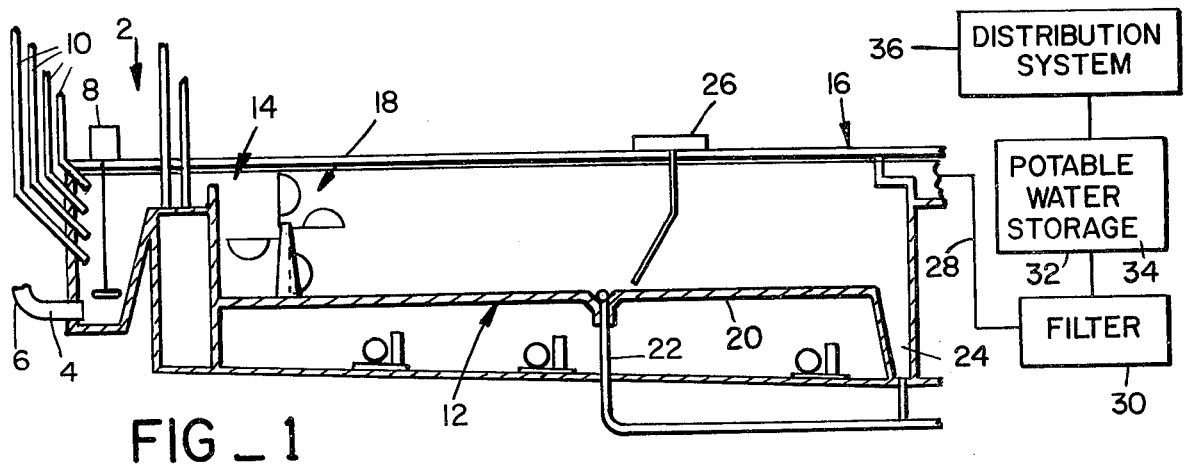
FIG_1
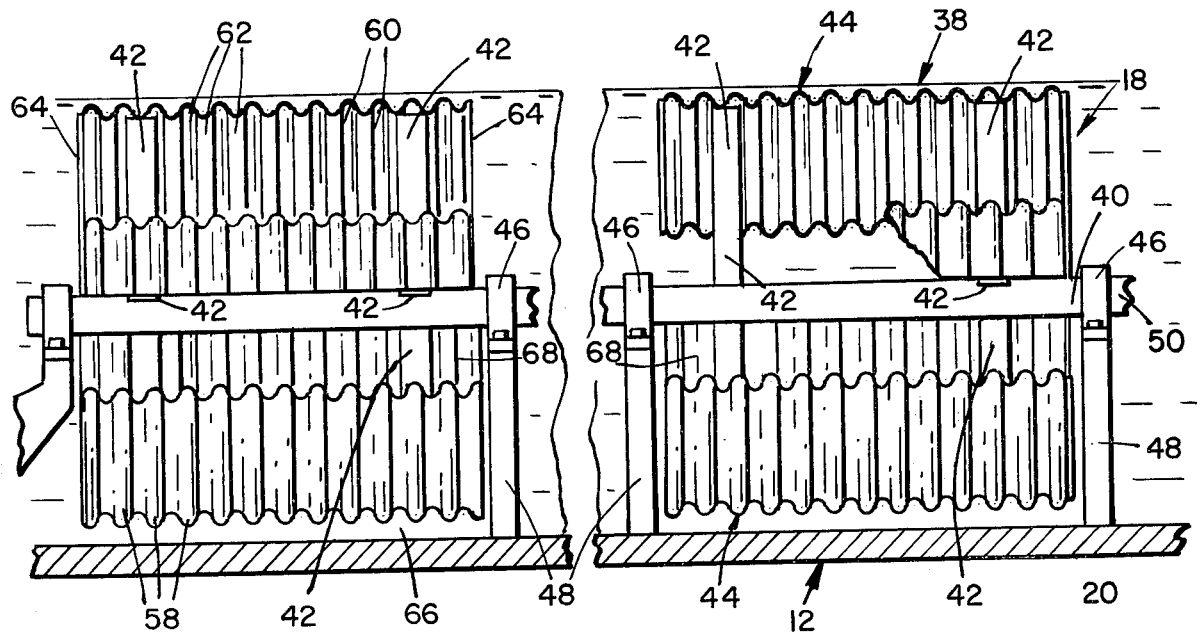
FIG_2
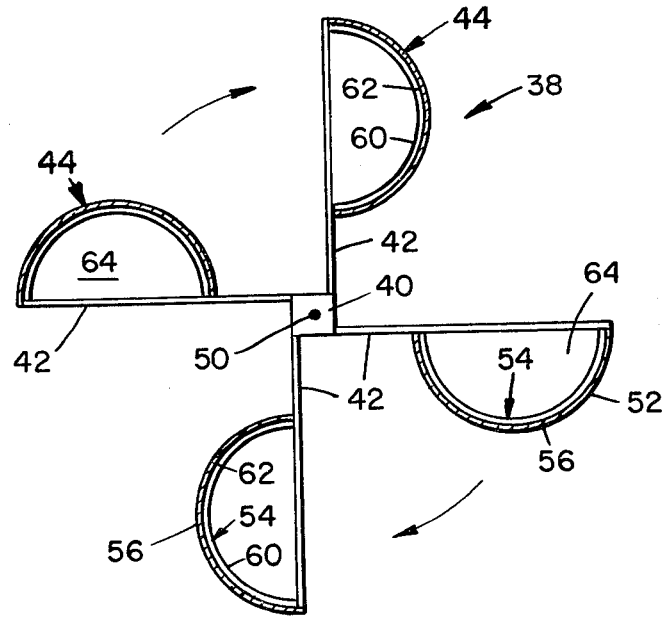
FIG_3

ZERO ENERGY INPUT FLOCCULATOR

BACKGROUND OF THE INVENTION

Water treatment plants generally process raw water, which includes particulate impurities, into potable water. In this process chemicals are introduced into the raw water for killing harmful bacteria and for an initial removal of particulate impurities suspended in the water. The chemicals and the water are mixed and the mixture is then passed via a flocculator to a sedimentation basin. In the sedimentation basin the water flows evenly and slowly and remains for a sufficient time so that particulate impurities entrapped in coagulated flocs can settle to the floor of the basin for subsequent removal. From the sedimentation basin the water passes to the water filters and hence to a suitable potable water storage for introduction in the water distribution system.

A major part of impurities in the raw water is removed in the sedimentation basin. This removal is performed by introducing a chemical, such as aluminum sulphate which coagulates into particles around particulate impurities. The particles are of such small size that they remain suspended in the water. To effectively settle them they must be combined into larger flocs which is accomplished by bringing as many particles as possible into contact.

It is conventional to provide flocculators which agitate the water as it enters the sedimentation basin. This agitation causes turbulence and an intimate mixing and brings particles into mutual contact so that flocs are formed. It is known that increased agitation enhances the formation of larger flocs which in turn shortens the required time to settle them in the basin. A shorter sedimentation time, in turn, makes it possible to shorten the length of the settlement basin and thus lowers the costs for the water treatment plant.

It is also known, however, that the increase in agitation is limited since the higher relative water speeds have a tendency to tear apart or separate the flocs into smaller agglomeration of particles. Thus, there is an optimal point in the operation of prior art flocculators which limits the maximum floc size that is attainable. Repeated attempts have been made to decrease the sedimentation times by increasing the floc density. However, an increase in the floc size, if it can be attained, would be more desirable since the sedimentation rate increases at a faster rate with an increase in the particle size.

A further and very costly drawback of prior art flocculators is their relatively large power consumption. The flocculators normally comprise rotatable hubs from which radial arms extend. Paddles made from wire mesh, flat boards or the like are mounted to the ends of the arms. To obtain the required water agitation the flocculators are power driven. Their relatively large size and their substantial water resistance consumes large amounts of energy. To reduce the energy consumption the effective flocculator areas opposing the water flow and causing the water agitation, such as the wires in the wire mesh or the boards, represent a relatively small proportion of the water flow cross section. Although in the past this was not thought to be significant, such a construction of the flocculators in fact reduces the flocculation effect as will be pointed out more fully hereinafter.

SUMMARY OF THE INVENTION

The present invention provides a flocculator which enables the formation of relatively large coagulant flocs while the need for any exterior power input to drive the flocculator is eliminated. The formation of such large flocs is possible by eliminating water agitation as the primary tool enhancing the formation of the flocs. Instead, the present invention relies heavily on gently flowing the raw water over large surfaces of the flocculator while water agitation is of only secondary importance. Furthermore, the need for an external power drive for the flocculator is eliminated by forming the surfaces into elongate cups or troughs which face the water flow in the basin and which are rotatable about an axis transverse to the water flow. The water flow thus is the sole source for motive power of the flocculator. Energy that was heretofore consumed in driving prior art flocculators is saved, thereby substantially reducing the operating costs of water treatment plants.

In its broadest aspects the present invention contemplates a flocculator for placement in a sedimentation basin which is defined by a hub that is rotatable about an axis extending transversely to the water flow. A plurality of equally spaced trough-shaped paddles is mounted to the hub for rotation therewith. The paddles are completely submerged and defined by relatively thin, undulated sheet members such as semi-circular sections of corrugated culvert pipe to enhance the strength and rigidity of the paddles and maximize the paddle surface. This surface maximization results from the added surface areas obtained from the semi-cylindrical paddle configurations and from the paddle undulations. This in turn increases the ultimate floc size, apparently because an increase in the total surface area of the paddle enhances the contacts between coagulant particles suspended in the raw water. Thus, the increase in floc size is not dependent on an increase in the water agitation and heretofore encountered limitations in the attainable floc size are eliminated. Additionally, the flocculator wheel rotates slowly with the water flow and thus causes only gentle water agitation which aids the formation of flocs without the danger of tearing apart already formed flocs.

In a preferred embodiment of the invention the paddles are oriented so that each trough faces upstream when it is adjacent the floor of the basin. This slightly increases the water speed in the space between the outermost edge of such paddle and the basin floor and helps prevent the accumulation of flocs, commonly referred to as sludge, in the space immediately beneath the flocculator. Furthermore, the projected width of the paddles, that is their width projected onto a plane aligned with the axis of rotation, is between about one-third to about one-fourth of the total water depth. This avoids an excessive obstruction of the water path past the flocculator. The flocculator includes at least four equally spaced, trough-shaped paddles so that water flowing unobstructed through the space between the paddles contacts at least partially the other paddle pair.

In another form of the invention the flocculator wheel can be installed in vertical water conduits where the water raises or falls instead of travelling horizontally. The operation of the flocculator, however, remains the same.

The trough-shaped configuration of the paddles and their transverse orientation to the water flow causes a rotation of the flocculator wheel by virtue of the water flow past it. The flocculator acts much like a water wheel and does not require an exterior power source.

Thus, the present invention increases the efficiency of the flocculator in terms of its intended function of aiding the formation of relatively large flocs while it eliminates the heretofore necessary exterior power drive. Consequently, the present invention enables the construction or shorter sedimentation tanks and eliminates the heretofore necessary expenditures for the power drive equipment and its energy consumption. Accordingly, the preent invention affords great cost savings as compared to the prior art.

BRIEF DESCRIPTION OF THE DRAWINGS

FIG. 1 is a schematic, side elevational view of the flocculation and sedimentation basin employed in a water treatment plant;

FIG. 2 is an enlarged front elevational view of a flocculator wheel constructed in accordance with the present invention; and FIG. 3 is a side elevational view of the flocculator wheel illustrated in FIG. 2.

DESCRIPTION OF THE PREFERRED EMBODIMENTS

Referring first to FIG. 1, the portions of a water treatment plant 2 relevant to this invention are schematically illustrated. Raw water 4 is supplied through an intake pipe 6 to a flash mixer 8 which mixes the raw water with chemicals supplied by feeder tubes 10. The resulting mixture enters a sedimentation tank 12 which may have a length of several hundred feet at an upstream end 14 of the tank. As is more fully described hereinafter the tank has a substantial width and depth so that the mixture flows at a slow and even speed toward a downstream or discharge end 16 of the tank. A flocculator 18 is disposed adjacent the upstream end and aids the formation of relatively large flocs that settle to a floor 20 of the tank and there form a sludge that is removed through a suitable sludge drain 22 and a cross collector 24. A sludge scraper 26 is normally provided which can reciprocate over the length of the sedimentation tank to move the sludge to the removal points. From the downstream end of the tank the water flows via suitable conduits 28 to water treatment filters 30, a treated water storage tank 32 in which potable water 34 is stored for later introduction into a water distribution system 36.

In operation raw water is continuously sent to mixer 8 and admixed with a coagulant, such as aluminum sulphate, and other chemicals supplied through feeder pipes 10. The coagulant forms a gelatinous substance which causes impurities suspended in the raw water to bind together into small particles. When the water enters sedimentation tank 12 at upstream end 14 it first contacts flocculator 18 which facilitates this binding together of particles into flocs of a sufficiently large size so that they will settle as sludge on the floor 20 of the tank before the water exits at downstream end 16. The present invention is particularly concerned with the construction and operation of the flocculator to increase the ultimate size of the flocs.

Referring now to FIGS. 2 and 3, the flocculator of the present invention broadly comprises a flocculator wheel 38 defined by an elongate hub 40 and a plurality of arms 42 that extend generally radially away from the hub in opposite directions. Paddles 44 are mounted to the arms. The hub extends across the width of the sedimentation tank substantially perpendicular to the flow of water therethrough and is mounted to bearings 46 supported by upright pillars 48. The flocculator wheel and the hub are rotatable about an axis 50 that extends perpendicular to the water flow across the width of the tank by journalling the hub in bearings 46 or by providing a fixed shaft about which the hub is rotatable. The number of pillars is determined by the construction of the hub and the tank width and is selected in accordance with well-known engineering principles. For relatively wide sedimentation tanks it is normally desired to provide intermediate support pillars at the center of the tank, for example. In such a case separate flocculator wheels are provided on each side of the central pillars and the paddles have a length slightly less than the spacing between the adjacent support pillars. For relatively narrow sedimentation tanks a single, continuous flocculator wheel in which the paddles 44 extend substantially across the full width of the tank is frequently more economical.

Each paddle is defined by a relatively thin sheet 52 that has a curved, semi-cylindrical configuration and that defines a concave trough 54 and a convex back 56. For the purposes of this specification and the claims the term "semi-cylindriccal configuration" includes any curved configuration, whether or not the curvature is circularly arcuate, which extends over an arc of no more than approximately 180°. The sheet member of the paddle includes a multiplicity of undulations 58 which alternatingly define peaks 60 and valleys 62 that extend over the width of the paddle perpendicular to the paddle length and generally parallel to the water flow direction. In the preferred embodiment of the invention the sheet member is defined by a half section of a conventional culvert pipe of the appropriate diameter.

The transverse undulations of the paddle serve a double purpose. First, they increase the surface area of the paddle and secondly they enhance its rigidity. Flocculator wheel arms 42 are conventionally secured to the sheet member by welding or riveting or with removable fasteners such as threaded bolts. The ends of the trough of each paddle may be left open, as illustrated in the righthand portion of FIG. 2, or they may be closed with end plates 64 as is illustrated in the lefthand portion of FIG. 2. The open troughs are more economical to construct and more suitable for applications in which the water in the sedimentation tank flows at an intermediate or relatively high speed. The closed construction, on the other hand, is more suitable for applications in which the water in the tank flows at a relatively low speed since this construction enhances the motive power transferred from the flowing water to the paddle for rotation of the flocculator wheel as is more fully described hereinafter.

In the preferred embodiment of the invention the flocculator wheel 38 is fitted with four equally spaced paddles 44 defining two opposing paddle pairs. The troughs 54 of all paddles face in the same direction of rotation of the flocculator wheel and for applications in which the water flow is horizontal, as is normal, the paddles are oriented so that when a paddle is at its lowermost position adjacent the tank floor 20 its trough 54 faces in an upstream direction. Thus, in operation the paddle adjacent the floor rotates in the same direction as the water flow. This, together with a slight increase of the water speed in the space 66 between the tank floor 20 and the paddle facilitates the constant removal of sludge from beneath the flocculator wheel and thus forestalls the possibility of a sludge accumulation which might impede the operation of the flocculator.

Although it is desired to maximize the surface area for contact between the water flow past the flocculator wheel and the paddle, care must be taken that the water flow is not impeded. Consequently, the paddle width, as projected onto a plane passing through the rotation axis 50 should not exceed approximately one-third of the water depth in the tank and preferably that width is between about one-fourth to one-third of the depth. There remains, therefore, a free central water flow area 68 between the paddles that is between one-third to one-half the full water depth. Although the water flowing through that space is not contacted by the adjacent paddles disposed above and below (when the flocculator wheel is in the position illustrated in FIGS. 2 and 3, for example) it does flow past the paddles in the second set which are disposed upstream and downstream of the axis of rotation. Consequently, at least a part of the water flowing through the free space will contact either the trough or convex back of such paddles to further enhance the formation of large flocs.

In operation the flocculator wheel 38 of the present invention performs a dual function. First, it presents a paddle surface area over which the incoming water must flow which is substantially greater than the "projected paddle surface" due to the semi-cylindrical configuration of the paddle and the surface enlarging undulations. The ultimate floc size appears to increase with the total surface area over which the water must flow. From this it can be deduced that the larger surface area has a direct relation to the increase in the floc size. Additionally, the undulations strengthen the paddle and render it more rigid so that a lesser number of connecting arms 42 is required.

The second function of the flocculator wheel is that by virtue of the uniformly oriented troughs 54 of paddles 44 the wheel acts as a water wheel that is powered by the water flow and rotates at a speed roughly equal to the speed of the water flow. This rotation is obtained without any external power supply. Consequently, all rotating parts of the wheel can be disposed within the confines of the sedimentation tank 12 and the body of water therein without any need to have parts protruding therefrom for connection to a suitable power drive. This simplifies the construction and reduces installation and operating costs.

The slow rotation of the flocculator wheel virtually assures that every water flow laminate contacts a paddle surface since in projection, as best seen in FIG. 3, there is substantially no water laminate which could pass the wheel without contacting one of the paddles and further since the rotation of the paddles continuously cuts across the water flow laminates. In addition, the rotating flocculator wheel provides the added advantage that it causes gentle water agitation which, as above summarized, enhances the formation of flocs. However, the wheel rotates at a very low rate since the floc formation due to water agitation is of only secondary importance so that there is no danger of tearing apart already formed flocs.

After the formation of the flocs they pass with the water flow to the sedimentation zone of the tank. The large floc sizes, as compared to the prior art, increase the rate with which the flocs settle on tank floor 20. Consequently, the stay time of the water in the tank can be reduced and, for a given water speed, the tank length can be shortened as compared to prior art tanks.

I claim:

1. In a method for processing raw water into potable water which includes the steps of forming a mixture by adding to the raw water a coagulating chemical, mixing the raw water with the chemical, forming flocs defined by a plurality of individual coagulated particles in a sedimentation basin holding the mixture, and separating the floc from the raw water by permitting the floc to settle in the basin, the improvement comprising the step of mechanically enhancing the formation of flocs by flowing the mixture through the basin in a downstream direction, placing a flocculator wheel in the mixture flow, the wheel having a plurality of cup-shaped, interconnected plate means, submerging the plate means in the mixture flow, and rotating the wheel about its axis by employing the mixture flow in the basin as the sole source of motive power for the wheel.

2. A method according to claim 1 wherein the plate means are disposed transversely to the water flow, and including the steps of rotating the plate means in the vicinity of a basin floor in the direction of the water flow.

3. A method of operating a flocculator in a water works settlement tank comprising the steps of flowing water in a generally horizontal direction through the tank and retaining the water for a sufficient time in the tank to permit coagulated floc particles to settle in the tank, providing a flocculator wheel having a plurality of generally cup-shaped paddles arranged about a rotatably mounted hub, submerging the wheel in the water in the settlement tank so that the cup-shaped paddles are arranged transversely to the direction of the water flow through the tank, and rotating the wheel with motive power derived solely from the water flow in the tanks.

4. A method according to claim 3 including the step of guiding water contacting the paddles generally parallel to the direction of the water flow.

5. In a water works sedimentation basin through which raw water treated with a coagulant flows at a relatively constant speed a flocculator comprising a wheel defined by a hub, a plurality of paddles submerged in this water disposed about and connected to the hub, each paddle comprising a curved sheet member having an elongate configuration and defining a trough, the troughs of all paddles facing in the same direction of rotation of the hub, the troughs extending over substantially the full width of the basin, and means rotatably mounting the wheel and positioning it within the basin so that the water flow therein rotates the wheel, whereby the water flow in the basin is diverted over relatively moving surfaces to enhance the coagulation process without the need for an external power supply to rotate the wheel.

6. Apparatus according to claim 5 wherein ends of the troughs defined by the sheet members are open.

7. Apparatus according to claim 5 including means closing ends of the troughs defined by the sheet members.

8. Apparatus according to claim 5 wherein the members are positioned so that the troughs face in an upstream direction when they are disposed adjacent a floor of the basin.

9. Apparatus according to claim 5 wherein the sheet member includes undulations oriented substantially perpendicular with respect to the length of the trough.

10. Apparatus according to claim 9 wherein the sheet member prescribes an arc of no more than 180°.

11. Apparatus according to claim 5 wherein the basin has a predetermined water depth, and wherein a projected width of each paddle is no more than about one-third the water depth.

12. Apparatus according to claim 11 wherein the projected width is between about one-fourth to about one-third the water depth.

13. Apparatus according to claim 12 wherein the wheel includes at least one pair of opposite paddles disposed at 180° spaced-apart points on the hub.

14. In a water treatment plant for converting raw water into potable water a flocculation and sedimentation basin through which chemically treated water flows in a downstream direction and means for facilitating the formation of relatively large flocs from relatively small coagulants and particles suspended in the water for the subsequent sedimentation of such flocs and their removal from the raw water, the means comprising an elongated flocculator wheel substantially completely submerged in the water flow adjacent an upstream end of the basin and extending across the width of the basin, the wheel having a hub, means mounting the hub for rotation about an axis extending across the width of the basin, at least two equally spaced paddles completely submerged in the water and means connecting the paddles to the hub, each paddle being defined by a relatively thin plate having a semi-cylindrical configuration defining a concave trough and a convex back, the troughs of the paddles facing in the same direction of rotation of the hub, the plate including a multiplicity of undulations extending transversely to the length of the trough, the plate further having a projected width which is at least about one-fourth the water depth in the basin, whereby the water flow in the basin rotates the flocculator wheel about the axis at a speed comparable to the water speed while coagulants in the water impinge on and are guided by the undulations of the plates which enhances the formation of the relatively large flocs and thereby shortens the time within which such flocs settle in the basin.

15. Apparatus according to claim 14 including a plurality of axially spaced paddles which together substantially span the width of the basin, and including means between the paddles for rotatably mounting the hub.

16. Apparatus according to claim 14 wherein the basin includes a substantially horizontal floor, and wherein the paddles are mounted so that each trough faces in an upstream direction when it is adjacent the floor.

17. Apparatus according to claim 14 wherein the sheet member comprises a semi-circular section of a culvert pipe.

18. Apparatus according to claim 14 wherein the hub mounting means includes journal bearings that mount the hub for free rotation in the bearings, and wherein all parts movable with the flocculator wheel are disposed within the confines of the basin and the body of water disposed therein.

19. In a water treatment plant including a flocculation and sedimentation basin receiving raw water treated with a coagulating chemical, a flocculator comprising at least two equally spaced paddles and means mounting the paddles for rotation about an axis transverse to the water flow in the basin, parts movable with the paddles being wholly disposed within the basin, each paddle being fully submerged in the water and having a width of at least about one-fourth the water depth in the basin and an enlarged surface area defined by a semi-cylindrical paddle configuration and a multiplicity of undulations in the paddle, concave sides of the paddles facing in a like direction of rotation of the flocculator so that the flocculator acts as a water wheel and receives its sole source of motive power from the water flow.

* * * * *